United States Patent Office 2,796,098
Patented June 18, 1957

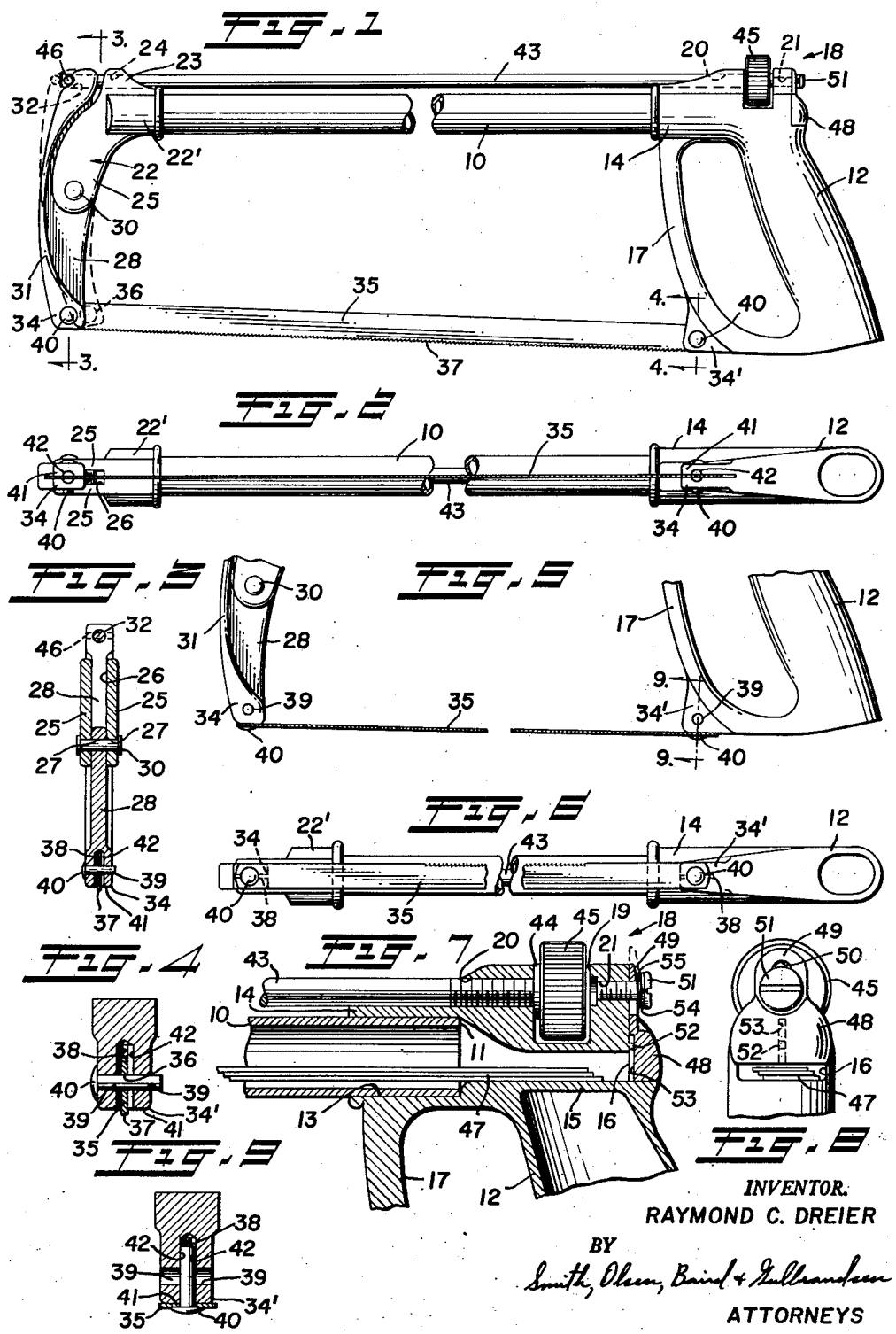

2,796,098

HAND-SAW CONSTRUCTION

Raymond C. Dreier, Chicago, Ill., assignor to Dreier Brothers, Inc., Chicago, Ill., a corporation of Illinois Application January 19, 1955, Serial No. 482,747

4 Claims. (Cl. 145—33)

The present invention relates to hand-saws and more particularly to an improved hand-saw especially useful to plumbers and other artisans whose work requires frequent use of hand operated hacksaws and the like.

An object of the present invention is to provide a lightweight, compact hand-saw of superior strength having its essential parts arranged about a principal frame member in such a manner that the blade may be placed in a higher degree of tension, with the frame member subjected to a substantially smaller accompanying bending moment, than has heretofore been known in conventional hand-saws of corresponding overall shape and size. Another object of the invention is to provide a saw of the above character having means accommodating selective rearrangement of the saw blade between a plurality of operative positions with respect to the saw frame, whereby the blade is adapted for use in cutting positions that would be extremely awkward or completely unaccessible in the operation of a conventional hand-saw. A further object of the invention is to provide a hand-saw, as described above, having a tensioning bar and conveniently arranged and easily operated means for tensioning the bar to tension and maintain the blade in any selected operating position, the arrangement being such that release of the tension in the blade permits immediate rearrangement of the blade from one operative position into another. Yet another object of the invention is to provide a hand-saw as described above wherein the cutting edge of the saw blade is unobstructed by wing nuts or other structure projecting from the frame below the blade and interfering with the cutting path, thus enabling the cutting edge of the blade to be used with a maximum of efficiency.

Further features of the invention pertain to the particular construction and arrangement of the hand-saw whereby the above outlined and additional operating features are obtained.

The invention, both as to organization and method of operation, together with further objects and advantages thereof, will best be understood by reference to the following specification taken in connection with the accompanying drawing in which:

Fig. 1 is a view in side elevation illustratng a hand-saw embodyng the invention, the saw having a portion of its frame broken away more clearly to show the configuration of that part of the frame, and the saw being illustrated with its saw blade in a first operative position wherein the blade is disposed substantially in the plane of the overall frame of the saw;

Fig. 2 is a view looking at the bottom of the hand-saw as illustrated in Fig. 1;

Fig. 3 is a sectional view taken along the line 3—3 of Fig. 1;

Fig. 4 is a fragmentary sectional view on an enlarged scale taken along the line 4—4 of Fig. 1;

Fig. 5 is a fragmentary view in side elevation illustrating the saw blade in a second operative position wherein the blade is disposed substantially normal to the plane of the frame of the hand-saw;

Fig. 6 is a view looking at the bottom of the hand-saw, illustrating the saw blade in the second operative position shown in Fig. 5;

Fig. 7 is an enlarged fragmentary view taken partly in vertical section through the upper right-hand portion of the hand-saw frame, illustrating a portion of the means for tensioning the saw blade and also showing a portion of a chamber in the frame adapted for the storage of extra saw blades;

Fig. 8 is an enlarged fragmentary elevational end view of the upper right-hand portion of the hand-saw frame; and Fig. 9 is afragmentary sectional view on an enlarged scale taken along line 9—9 of Fig. 5.

Referring now to Fig. 1 of the drawings, the hand-saw there illustrated and embodying the features of the present invention, comprises a frame including a longitudinally extending hollow tube 10 disposed along the principal length of the saw. The right-hand or inner end 11 of the tube is snugly received, and secured by press fitting, silver soldering or the like, in an opening 13 (Fig. 7) provided in a longitudinally extending boss 14 on the upper end of a downwardly extending handle 12. The handle may be cast as a unitary piece having a hollow construction, as illustrated, and including an interior longitudinally extending floor member 15 which abuts the right-hand end of the tube 10 and extends across the hollow downwardly extending hand grip portion of the handle to form the lower lip of an opening 16 provided in the right-hand upper portion of the handle. The handle also includes an exterior hand guard 17, and an integrally formed bifurcation-like formation 18 which extends above the level of the tube 10 on the upper end of the handle 12. This formation includes a transversely extending slot 19 (Fig. 7) which is intersected by a pair of longitudinally extending and axially aligned holes 20 and 21, the axes of which are disposed substantially in the plane of the frame as defined by the tube 10 and handle 12, the right-hand hole 21 being internally threaded and provided with a reduced diameter for a purpose subsequently described.

Fixed to the left-hand or outer end of the tube 10, is a downwardly extending bracket 22 which has integrally formed thereon a longitudinally extending boss 22′ having an opening for receiving the left-hand end of the tube which is suitably secured therein as by press fitting, silver soldering or the like. The uppermost portion 23 of the bracket has therein a longitudinally extending tension bar receiving hole 24 located in axial alignment with the hole 20 in the handle formation 18. The downwardly extending portion of the bracket is bifurcated and comprises a pair of laterally spaced ears 25 which extend downwardly and form a slot 26 therebetween (Fig. 2) disposed substantially in the plane of the frame. The lower extremities of the ears are provided with a pair of transversely extending aligned holes 27 that are located about half the distance below the tube 10 as the outer or lower end of the handle 12.

As best shown in Fig. 1, a substantially upright link 28 is arranged in the slot 26 between the ears 25 for pivotal movement substantially within the plane of the frame. The link is pivotally mounted on a pivot pin 30 which occupies the aligned holes 27 of the ears 25 and extends loosely through a suitable opening in the central portion of the link. The left-hand or outer edge of the link is of increased thickness for providing a curved strengthening rim 31 which is gracefully rounded, so that the outer end of the saw, of which the link is a part, may be comfortably gripped in one hand while the other hand grasps the handle 12 during two-handed sawing operations. The lowermost end portion 34 of the link extends substantially the same distance below the tube 10 as does the lower end of the handle assembly, and the upper end of the link extends to a level slightly above the tube 10 where it is provided with a longitudinally extending tension bar-receiving opening 32 that is substantially aligned with the corresponding hole or opening 24 in the uppermost portion 23 of the bracket 22.

The lowermost portion of the handle assembly, below the guard 17, has a portion 34' formed thereon which corresponds to the lowermost end portion 34 of the link 28, these portions being adapted to receive the opposite ends of a conventional hack-saw blade 35 having a cutting edge 37 thereon and having a hole in each of its ends. The construction and arrangement of the two blade receiving portions 34 and 34' is such that they accommodate the attachment of the saw blade to the frame in a first operative position (Figs. 1 to 4, inclusive) wherein the saw blade lies substantially in the plane of the frame, and also in a second operative position (Figs. 5, 6 and 9) wherein the saw blade lies substantially normal to the plane of the frame. It is apparent from the longitudinally spaced arrangement of the blade receiving portions 34 and 34' that the saw blade may be tensioned in either operative position by selectively separating these portions through movement of the pivotally mounted link 28, as subsequently more fully described. Thus, as shown in Fig. 1, the blade is in an untensioned condition when the link 28 is in its broken line position, and in a tensioned condition when the link is in its full line position.

More particularly, the blade receiving portions 34 and 34' are of substantially identical construction with each having therein an upwardly and longitudinally extending narrow slot 38 (Figs. 3 and 4), the slots opening centrally through the underside of each portion 34 or 34' and being disposed substantially in the plane of the frame for snugly receiving the respective ends of the saw blade for attachment in the first operative position. The blade receiving portions 34 and 34' also each has therein a transverse pin-receiving opening 39 which intersects the longitudinal blade receiving slot and is adapted to register with the corresponding opening in the blade end when the blade is in position in the slots. Each opening 39 slidably receives a flat headed, rivet-like, cylindrical blade retaining pin 40 which extends through the opening in the end of the blade and thus anchors the blade in place. Tensioning of the blade, in the manner about to be described, causes these pins to bind in the openings 39 and thus prevent their inadvertent removal. On the other hand, when the tension in the blade is released the pins 40 may be quickly withdrawn from the openings 39, whereupon the blade may be immediately lifted from the longitudinal blade receiving slots.

In order to accommodate arrangement of the saw blade in the second operative position, the underside of each blade receiving portion 34 and 34' is provided with a planar surface 41 having substantially the same width as the blade 35. These surfaces are disposed substantially normal to the plane of the frame and are substantially coplanar when the link 28 is in the full line position shown in Fig. 1. Each of the planar surfaces 41 also has therein an upwardly extending cylindrical pin-receiving opening 42, the axis of each opening preferably lying substantially in the longitudinal central plane of the frame, in which position the openings 42 are intersected by the longitudinal blade receiving slots 38. The openings 42 are adapted to register with the respective holes in the ends of the saw blade when the blade has been moved from the first position shown in Fig. 1 into the second position shown in Fig. 6, wherein the flat ends of the blade lie upon the bottom planar surfaces 41 of the blade receiving portions 34 and 34'. The saw blade (when tensioned) is maintained in this second operative position by the blade retaining pins 40, each of which extends upwardly through the holes in the blade ends and is slidably received in one of the openings 42 so that the thin flat heads of the pins are substantially flush with the underside of the blade. Again, the pins are retained in this position by the tensional forces transferred through the saw blade, the tension of the blade causing the pins to bind in the openings 42.

It is believed that the particular construction and arrangement of the blade receiving portions 34 and 34' embody in the saw a higher degree of versatility than has heretofore been attained in the hand-saw art. More particularly, it should be noted that the bottom planar surfaces 41 of the blade receiving portions 34 and 34' comprise the lowermost extremities of the hand-saw frame. When the blade is arranged in the first operative position and disposed substantially in the plane of the frame, the teeth of the saw blade lie substantially in the plane of the bottom planar surfaces, and neither the cutting edge 37 nor the sawing stroke is obstructed by wing nuts and the like which in the ordinary hack-saw extend below the cutting edge of the blade. Accordingly, the workman has at his disposal a cutting edge which may be advantageously used to cut completely through a work piece toward a planar surface supporting or immediately adjacent to the work piece, such as cutting laterally through a pipe or the like extending longitudinally of and immediately adjacent to a wall surface. When the blade 35 is arranged in the second operative position and disposed substantially normal to the plane of the frame, on the other hand, the ends of the blade overlie and rest upon the bottom planar surfaces 41 of the fixtures. In this position, the blade itself, except for the thin flat heads of the blade retaining pins 40, comprises the lowermost extremity of the hand-saw and presents an unobstructed cutting edge 37 disposed in a plane substantially normal to the plane of the frame. This arrangement of the blade has many advantages and is particularly useful for making cuts impossible to make with a conventional handsaw. The arrangement accommodates the severing of a work piece in a cutting plane substantially flush with a planar surrounding surface, such as the cutting of an outwardly extending pipe in a plane substantially flush with a supporting wall. Thus, the workman has at his immediate disposal a handsaw having a blade that may be easily and selectively rearranged between operative positions so as to present an unobstructed cutting edge adapted for use in unobstructed cutting strokes and positions that were heretofore extremely awkward or impossible in the operation of a conventional hand-saw.

In order to spread the blade receiving portions 34 and 34' longitudinally with respect to the longitudinal frame member 10 for tensioning the saw blade in either of its operative positions, there is provided a longitudinally extending cylindrical tension bar 43 which is slidably received through the aligned holes 20, 24 and 32 provided in the bifurcation-like formation 18 at the top of the handle, in the upper portion 23 of the bracket 22, and in the upper end of the link 28, respectively.

The right-hand end of the bar 43 is threaded and extends from the hole 20, through a washer 44, and is threadably received in a knurled nut 45 that is arranged for rotation in the slot 19 which prevents longitudinal movement of the nut with respect to the saw frame. The left-hand end of the bar extends from the hole 32 and carries a cross pin 46 which is pivotally received in a cross groove formed in the outer surface of the upper end of the link, and operates to prevent rotation of the bar with respect to the frame when the knurled nut 45 is rotated for tensioning or releasing tension in the blade. In view of the foregoing, it is apparent that rotation of the nut 45 in one direction operates to shift the bar to the left of the frame, as viewed in Fig. 1, thereby freeing the link 28 for pivotal movement from the solid line position shown in Fig. 1 to its broken line position wherein the blade 35 is untensioned and may be readily removed from either of its two operating positions merely by removal of the pins 40. Counter-rotation of the nut 45 operates to shift the bar to the right of the frame, as viewed in Fig. 1, for pivoting the link about the pin 30 and longitudinally spreading the blade receiving portions 34 and 34' for tensioning the saw blade.

As previously noted, the bracket 22 on the outer end of the saw extends downwardly from the longitudinal frame member 10 a distance about half the length of the handle, while the link 28 is pivotally mounted on the lower end of the bracket with its upper end extending upwardly somewhat above the level of the longitudinal member 10 where the tensioning bar 43 operatively joins it. The blade receiving lower end 34 of the link, on the other hand, is located approximately the same distance below the frame member 10 as is the blade receiving portion 34' on the handle. This permits the blade 35 to be positioned substantially parallel to the frame member 10, the handle assembly and the link 28 acting, in effect, as a pair of downwardly extending blade receiving legs. More importantly, however, this novel arrangement of parts provides a saw which has approximately the same overall height of saw-frame, and approximately the same cutting depth (distance from the cutting edge of the saw blade 35 to the underside of the longitudinal frame member 10), as an ordinary hack-saw, but one wherein tensioning of the blade subjects the longitudinal frame member 10 to less bending moment than occurs in previously known saws of corresponding height and cutting depth. Because of this important fact the present saw is substantially stronger than corresponding saws of previously known structure and may be constructed of lighter materials, thereby reducing the weight of the saw and reducing to some extent the amount of energy needed to operate it.

When the blade 35 requires exchange or replacement, the nut 45 is turned in the proper direction to release the tension in the blade, and the pins 40 and the blade are removed from the frame in the manner previously explained. Extra blades 47 are stored in the hollow interior of the tube 10, and the upper aligned hollow portion of the handle 12 is provided with the floor member 15 for accommodating easy removal of the blades through the opening 16 in the handle. A sliding cap 48 is provided for closing the opening and includes an enlarged portion, which generally conforms to the corresponding adjacent configuration of the handle, and an upstanding ear 49 provided with a vertical slot 50. The cap is slidably arranged on the handle by means of a screw 51 that extends through the slot 50 and is threadably received in the hole 21 in the bifurcation-like formation 18. The cap is prevented from rotating about the screw by means of a small boss 52 extending from the formation 18 and slidably engaging a slot 53 formed in the inner surface of the cap. As best seen in Fig. 7, the outer face of the upstanding ear 49 is provided with a slight curvature so that the ear has a greater thickness at its base than at its upper end. Thus, when the cap is raised the thicker portion of the ear will be raised to a position between the outer end of the bifurcation-like formation and a spring washer 54 disposed between the head of the screw 51 and the outer surface of the ear. This compresses the spring washer and retains the cap in its upper or open position when it is moved to the open position. Similarly, the cap is retained in closed position by the normal pressure of the spring washer on the outer face of the ear 49. If desired, a flat washer 55 may be employed between the spring washer and the face of the ear 49 so as to prevent undue wear on the ear.

The foregoing description of one embodiment of the present invention has been made for clearness of understanding only and no unnecessary limitations are intended thereby, for it will be apparent to those skilled in the art that numerous variations and modifications may be made in the saw within the spirit and scope of the appended claims.

I claim:

1. A hand-saw comprising, a longitudinally extending hollow tubular frame member, a downwardly extending leg element on the forward end of said tubular frame member, said leg and said frame member defining the longitudinal plane of said saw, a downwardly extending handle having a horizontal passage extending therethrough into one end of which the rear end of said tubular frame member is fixedly received, a closure member slidably mounted on said handle for selectively closing and opening the other end of said passage to permit extra blades to be inserted through said passage and into said tubular member for storage therein, the uppermost portions of said handle and said leg respectively extending upwardly above said tubular frame member and having aligned guide passages therein, a substantially upright link pivotally mounted intermediate its ends upon the lower extremity of said leg, a saw means for connecting blade at one of its ends to said handle and at its other end to the lowermost end of said link, a longitudinally extending tensioning rod slidably mounted in said aligned guide passages of said handle and said leg, the forward end of said rod being pivotally secured to the upper end of said link, and means on said handle and cooperating with said rod for forcefully sliding said rod in said guide passages to pivot said link in a direction tensioning said blade.

2. The combination set forth in claim 1, wherein said handle and said lowermost end of said link each has a planar surface thereon substantially normal to said plane of said saw and against which one side of said saw blade is adapted to lie, and wherein said blade connecting means comprises a pair of rivet-like pins respectively extending through the opposite end portions of said blade and slidably received in upwardly extending openings provided in said planar surfaces, the tensional forces in said blade causing said pins to bind in said openings and thus anchor said pins therein, said pins having heads thereon retaining said blade on said pins.

3. A hand-saw comprising, a longitudinal frame member, a pair of spaced-apart downwardly extending saw-blade receiving members at the opposite ends of said longitudinal frame member, said downwardly extending members and said longitudinal frame member together defining the longitudinal plane of said saw, a pair of substantially coplanar surfaces respectively provided on the lowermost ends of said downwardly extending blade receiving members, said coplanar surfaces being disposed substantially normal to said longitudinal plane of said saw and each having therein an upwardly extending pin-receiving cavity, a saw-blade disposed in position normal to said plane of said saw and having pin-receiving apertures in its opposite end portions, the upper side of said blade being in intimate underlying contact with said coplanar surfaces with said pin-receiving apertures in alignment with said upwardly extending pin-receiving cavities, a pair of removable rivet-like blade mounting pins having substantially cylindrical body portions and substantially thin flat heads on one end thereof, said body portions of said pins slidably extending upwardly through said apertures in said saw-blade and well into said pin-receiving cavities so that the heads of said pins engage the underside of said blade, said blade and said heads constituting the lowermost extremity of said saw, and means for moving one of said downwardly extending blade receiving members with respect to the other to increase the distance between said pins to tension said blade, the tensional forces of said blade being applied to the body portions of said pins adjacent their heads to cause said pins to bind against the opposite side walls of said cavities and thereby be anchored therein while said blade is under tension, said heads of said pins serving to retain said blade on said pins, and said pins being readily removable from said pin-receiving cavities to permit quick removal of said blade when the tension in said blade is released.

4. A hand-saw comprising, a longitudinal frame member, a pair of spaced-apart downwardly extending saw-blade receiving members at the opposite ends of said longitudinal frame member, said downwardly extending members and said longitudinal frame member together defining the longitudinal plane of said saw, a pair of substantially coplanar surfaces respectively provided on the lowermost ends of said downwardly extending blade receiving members, said coplanar surfaces being disposed substantially normal to said longitudinal plane of said saw and each having therein an upwardly extending substantially cylindrical pin-receiving cavity and a longitudinally extending slot in said longitudinal plane and intersecting said cavity, a saw-blade disposed in position normal to said plane of said saw and having pin-receiving apertures in its opposite end portions, the upper side of said blade being in intimate underlying contact with said coplanar surfaces with said pin-receiving apertures in alignment with said upwardly extending pin-receiving cavities, a pair of removable rivet-like blade mounting pins having substantially cylindrical body portions and substantially thin flat heads on one end thereof, said body portions of said pins slidably extending upwardly through said apertures in said saw-blade and well into said pin-receiving cavities so that the heads of said pins engage the underside of said blade, said blade and said heads constituting the lowermost extremity of said saw, means for moving one of said downwardly extending blade receiving members with respect to the other to increase the distance between said pins to tension said blade, the tensional forces of said blade being applied to the body portions of said pins adjacent their heads to cause said pins to bind against the opposite side walls of said cavities and thereby be anchored therein while said blade is under tension, said heads of said pins serving to retain said blade on said pins, said pins being readily removable from said pin-receiving cavities to permit quick removal of said blade from contact with said coplanar surfaces and to permit insertion of the opposite end portions of said blade into said longitudinally extending slots, said downwardly extending blade receiving members having laterally extending passages therethrough intersecting said slots for receiving said pins to anchor said blade in said slots.

References Cited in the file of this patent

UNITED STATES PATENTS

| | | |
|---|---|---|
| 685,534 | Smith | Oct. 29, 1901 |
| 878,160 | Stebbins | Feb. 4, 1908 |
| 1,394,174 | Ireland et al. | Oct. 18, 1921 |
| 2,332,545 | Acomb | Oct. 26, 1943 |
| 2,399,869 | Haugh | May 7, 1946 |
| 2,436,743 | Carlson | Feb. 24, 1948 |
| 2,514,880 | Leatherman | July 11, 1950 |

FOREIGN PATENTS

| | | |
|---|---|---|
| 381,070 | Germany | Sept. 15, 1923 |